United States Patent [19]  
Watanabe et al.

[11] Patent Number: 4,586,722  
[45] Date of Patent: May 6, 1986

[54] ALL-WHEEL-STEERABLE VEHICLE

[75] Inventors: Masaki Watanabe, Saitama; Akio Yagasaki, Tokyo; Yoshinori Matsuoka, Saitama, all of Japan

[73] Assignee: Honda Giken Kogyo Kabushiki Kaisha, Tokyo, Japan

[21] Appl. No.: 633,370

[22] Filed: Jul. 23, 1984

[30] Foreign Application Priority Data

Jul. 22, 1983 [JP] Japan ................. 58-132919

[51] Int. Cl.⁴ .............................................. B62D 7/06
[52] U.S. Cl. ..................................... 280/103; 180/236
[58] Field of Search ................. 280/91, 98, 99, 103; 180/234, 236

[56] References Cited

U.S. PATENT DOCUMENTS

| | | | |
|---|---|---|---|
| 883,371 | 3/1908 | Young | 280/99 |
| 2,824,749 | 2/1958 | Yasuda | 280/91 |
| 4,105,086 | 8/1978 | Ishii et al. | 280/91 |
| 4,163,566 | 8/1979 | Tapp | 280/91 |

Primary Examiner—John J. Love  
Assistant Examiner—Kenneth R. Rice  
Attorney, Agent, or Firm—Lyon & Lyon

[57] ABSTRACT

An all-wheel-steerable vehicle has two front wheels, two rear wheels, and a steering system for steering the front and rear wheels in interlinked relation. The front and rear wheels are steered in the opposite directions to each other, and the steering angle of the front wheels is greater than the steering angle of the rear wheels. The vehicle thereby gives the driver a favorable drive feeling while obtaining a small radius of turning movement of the vehicle.

5 Claims, 8 Drawing Figures

ALL-WHEEL-STEERABLE VEHICLE

BACKGROUND OF THE INVENTION

1. Field of the Invention

The present invention relates to an all-wheel-steerable vehicle, and more particularly a four-wheel-steerable vehicle having steerable front and rear wheels.

2. Description of the Prior Art

There has heretofore been proposed a vehicle having front and rear wheels steerable in the opposite direction to each other and by the same angle so that the vehicle can turn along a path with a small radius. The prior all-wheel-steerable vehicle however has such properties that when a slip angle, which is the angle between the heading of the wheel and the moving direction of the wheel, becomes greater by the increase of the forces imposed on the tires, the position of the center of turning movement of the vehicle is changed.

The present invention has been made in view of properties of the foregoing prior vehicle.

SUMMARY OF THE INVENTION

It is an object of the present invention to provide an all-wheel-steerable vehicle which will give the driver a favorable drive feeling even under such conditions that the tires have relatively large slip angles.

According to the present invention, a vehicle has two front wheels, two rear wheels, and a steering means for steering the front and rear wheels in interlinked relation. The front and rear wheels are steered in the opposite directions to each other, and the front wheels are steered by an angle which is greater than an angle by which the rear wheels are steered.

According to a preferred embodiment of the present invention, the front wheels comprise a pair of balloon tires and the rear wheels comprise a pair of balloon tires, and a driver's seat is positioned substantially centrally in the vehicle.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENT

Figure 1:
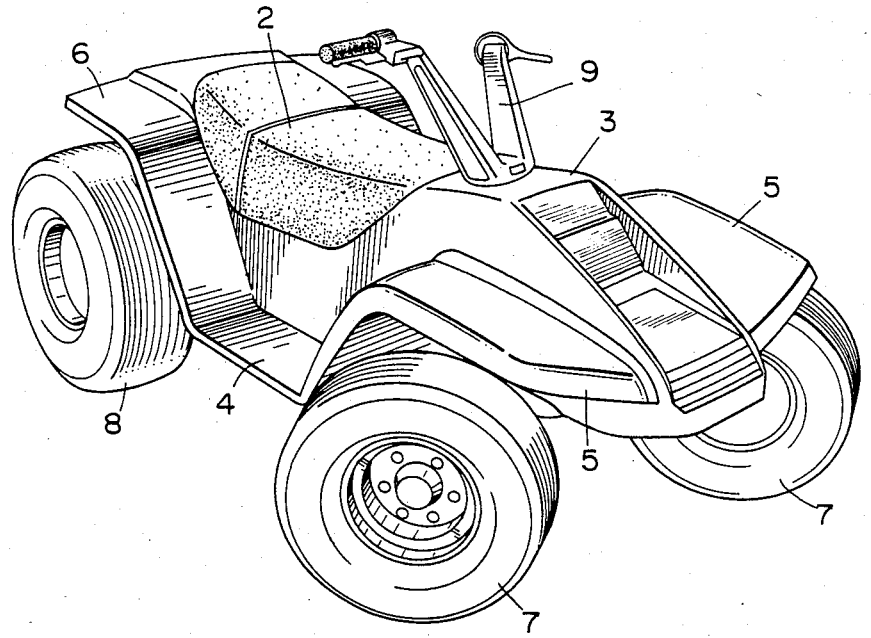
FIG. 1 is a perspective view of an all-wheel-steerable vehicle according to a preferred embodiment of the present invention.
Figure 2:
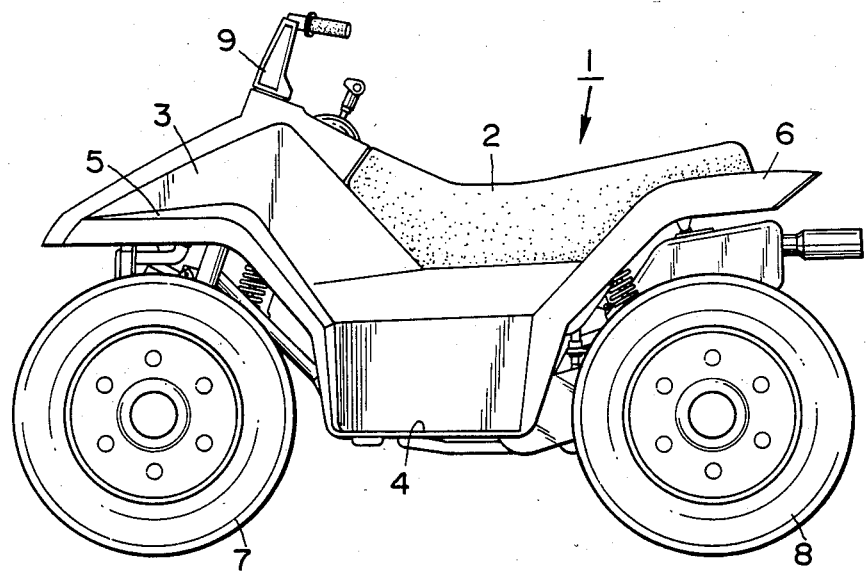
FIG. 2 is a side elevational view of the vehicle shown in FIG. 1.

FIGS. 1 and 2 illustrate a four-wheel-driven and four-wheel-steerable vehicle 1 according to a preferred embodiment of the present invention, the vehicle 1 having a central saddle seat 2 similar to one on an ordinary motorcycle for allowing a driver to ride astride thereon. The vehicle 1 has a body cover 3 extending around the saddle seat 2 and including side steps 4 (only one shown), a front fender 5, and a rear fender 6 which are all of an integral construction.

The vehicle 1 has a pair of laterally spaced front wheels 7 and a pair of laterally spaced rear wheels 8, each wheel having a low-pressure tire. These wheels are steered in ganged or interlinked relation by the operation of a V-shaped steering handlebar 9. The front and rear wheels 7, 8 are drivable by power from a power unit.

Figure 3:
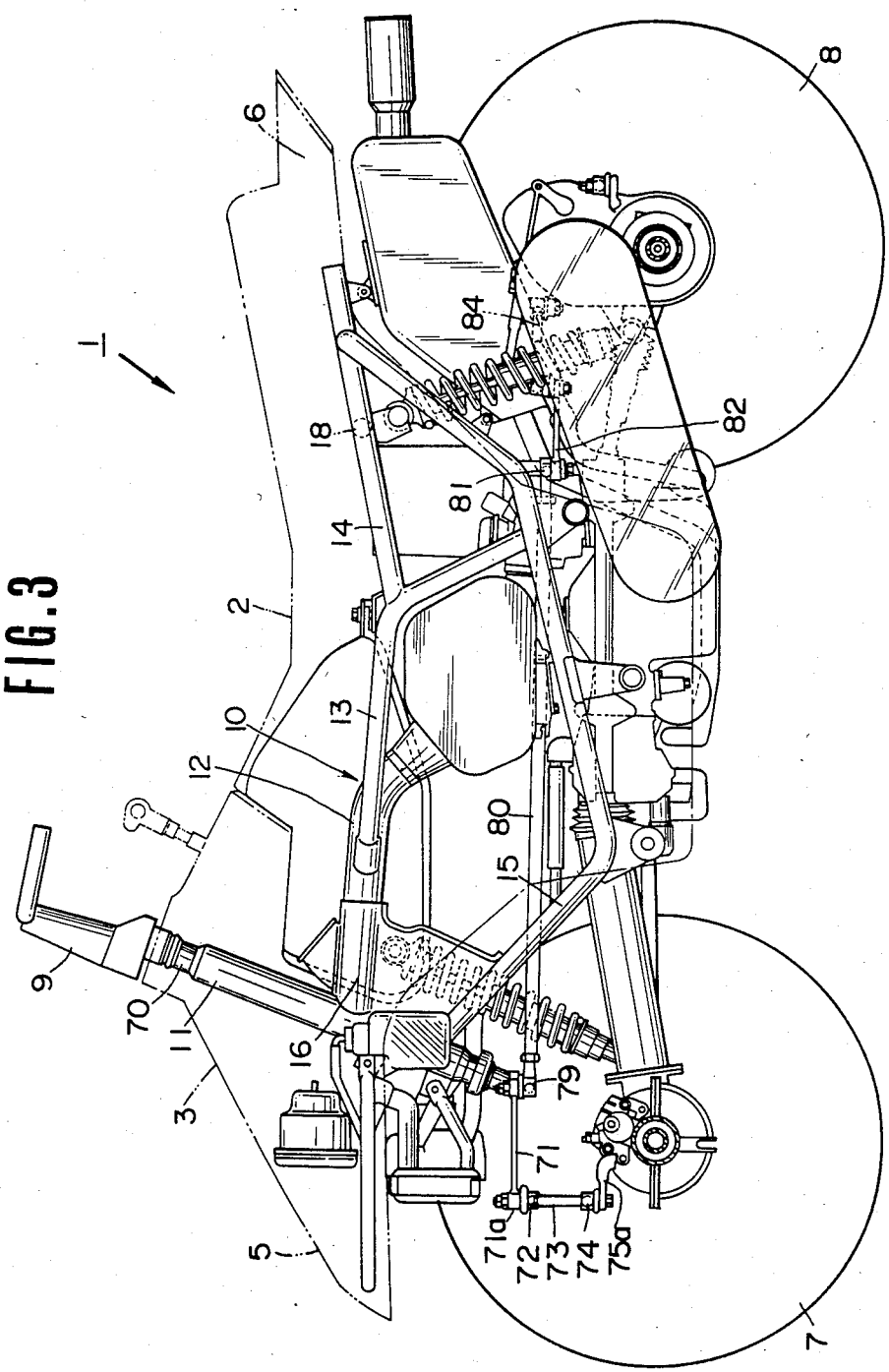
FIG. 3 is a side elevational view showing a frame, suspensions, and a steering system of the vehicle of FIG. 1.

As shown in FIG. 3, the vehicle 1 includes a frame 10 having a similar construction to that of an ordinary motorcycle. The frame 10 is composed of a head pipe 11, a backbone tube 12 having a front end secured to the head pipe 11 and extending in a rearward direction from the head pipe 11, a pair of side pipes 13 having front ends secured to opposite sides of the backbone tube 12 and rear end portions curved downwardly, a pair of rear stays 14 having front ends secured to the curved rear end portions of the side pipes 13 and extending rearward therefrom, and a pair of down tubes 15 having front ends curved upwardly and secured to the head pipe 11, intermediate portions secured to lower ends of the side pipes 13, and upwardly curved rear ends secured to the rear stays 14. The head pipe 11, the backbone tube 12, and the down tubes 15 have front joined portions firmly reinforced by a reinforcement member or gusset 16.

A steering system of the vehicle will be described with reference to FIGS. 3 through 5.

A steering stem 70 is fitted in the head pipe 11 of the body frame 10 for angular movement about its own axis. The V-shaped steering handlebar 9 is mounted on an upper end of the steering stem 70. A steering lever 71 is connected to a lower end of the steering stem 70 and is in the form of a bell crank composed of a first arm 71a extending forward and a second arm 71b extending laterally. The first arm 71a is linked to knuckle arms 75a of front knuckles 75 through ball joints 72, front tie rods 73, and ball joints 74.

Figure 4:
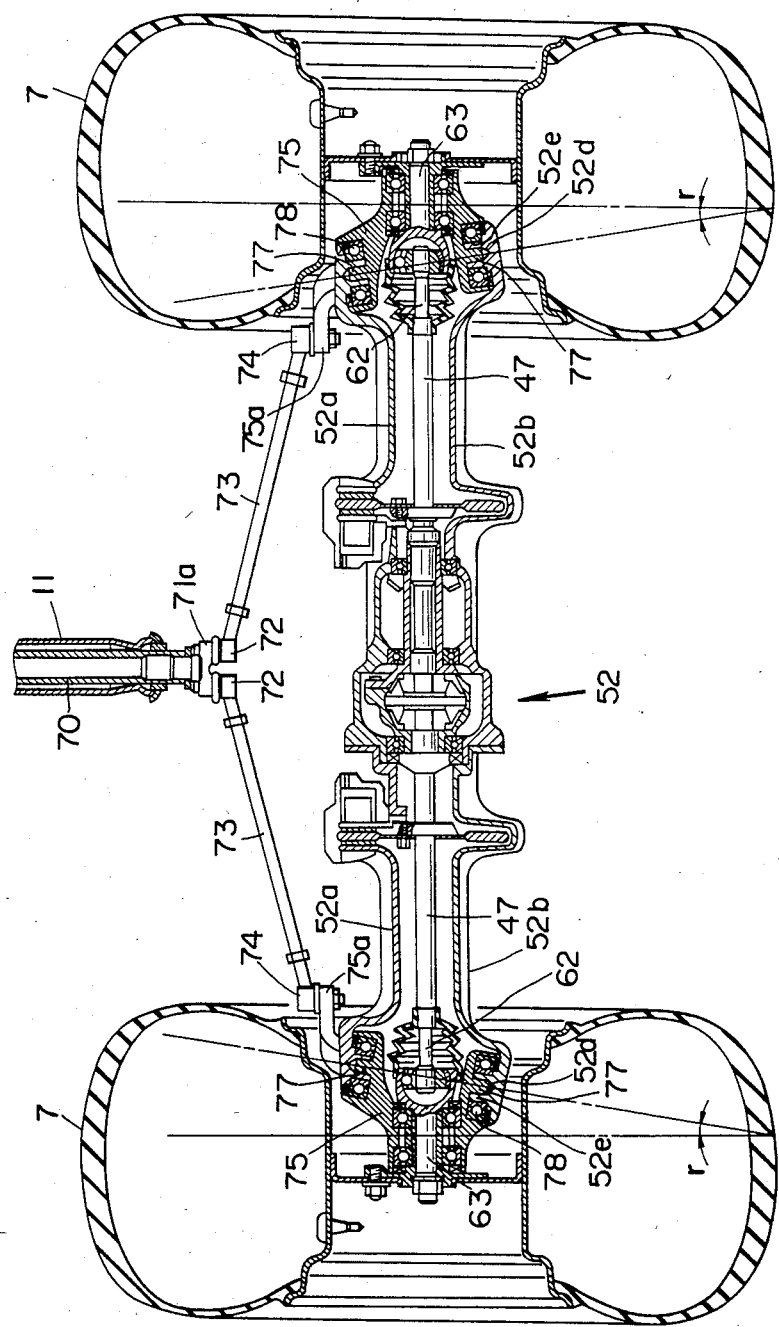
FIG. 4 is a transverse cross-sectional view of the vehicle of FIG. 1, showing a front wheel steering mechanism of the vehicle.

As shown in FIG. 4, a front axle housing 52 is composed of upper and lower axle housings 52a, 52b each having in their opposite ends kingpin recesses 52d and bearing sleeves 52e. A kingpin 77 of the front knuckle 75 is fitted in each of the kingpin recesses 52d, while the front knuckle 75 is fitted in each bearing sleeve 52e with a bearing 78 interposed. The front knuckle 75 is angularly movable about the kingpin 77 inclined at an angle r to the vertical.

Front axles 47 have outer ends coupled via constant-velocity joints 62 to front wheel shafts 63 which are rotatably mounted on the front knuckles 75, the front wheels 7 being securely attached to the front wheel shafts 63.

Figure 5:
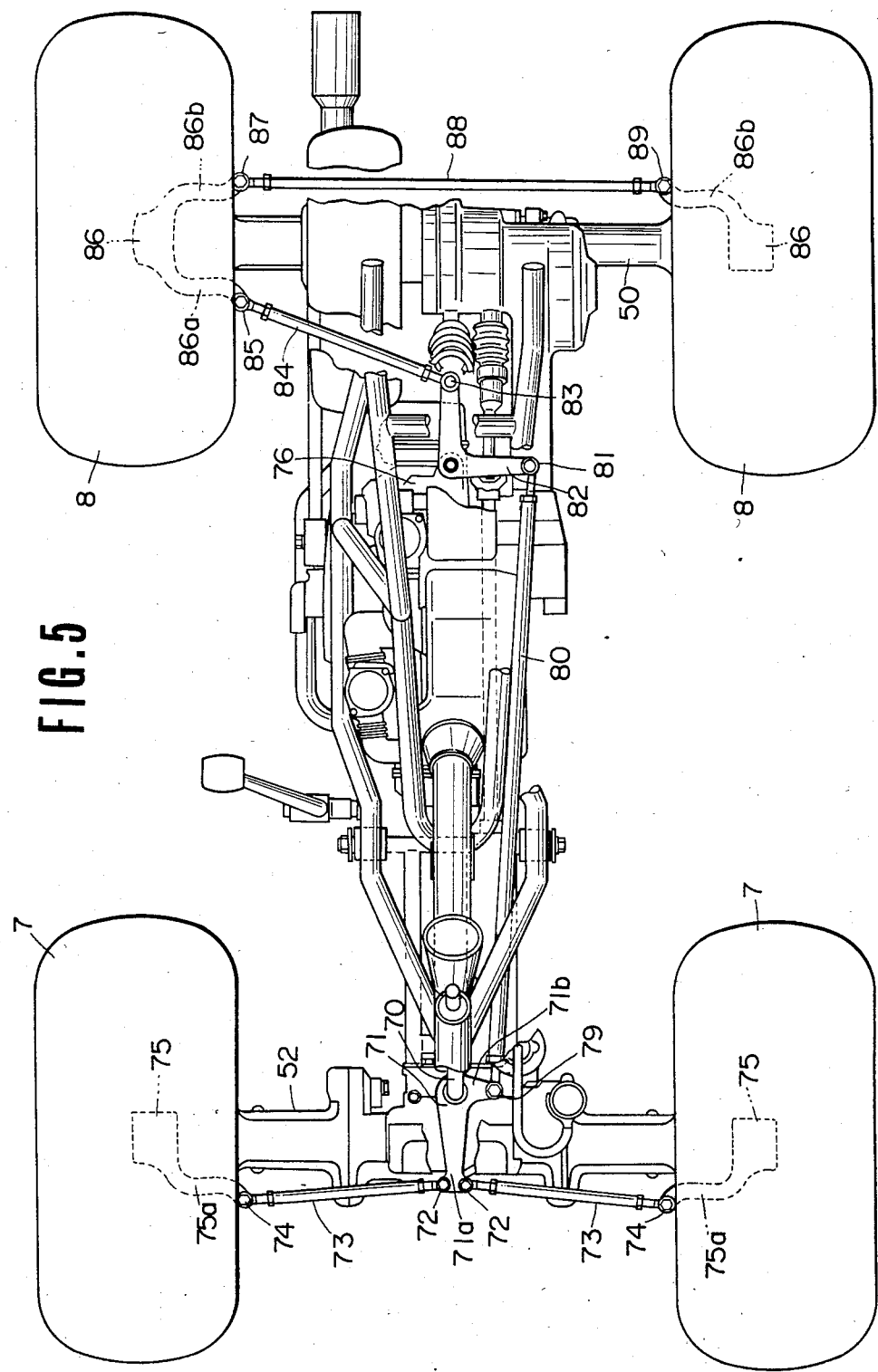
FIG. 5 is a plan view, partly broken away, of the vehicle of FIG. 1, illustrating the frame and the steering system of the vehicle.

As illustrated in FIG. 5, a rear axle housing 50 has opposite ends which have the same construction as that of the front axle housing 52, and rear knuckles 86 are of the same construction as that of the front knuckles 75 and are angularly movable.

Rear axles have outer ends coupled via the constant-velocity joints to rear wheel shafts which are rotatably mounted on the rear knuckles, the rear wheels 8 being securely attached to the rear wheel shafts. The rear wheel construction is the same as the front wheel construction, and is omitted from illustration.

The second arm 71b of the steering lever 71 is pivotally connected to a front end of a steering rod 80 through a ball joint 79. The steering rod 80 has a rear end pivotally connected by a ball joint 81 to one arm of a bell crank 82 pivotally supported on an engine casing 76. The other arm of the bell crank 82 is coupled through a ball joint 83, a drag link 84, and a ball joint 85 to a knuckle arm 86a of a righthand rear knuckle 86. The righthand rear knuckle 86 has a tie rod arm 86b coupled through a ball joint 87, a tie rod 88, and a ball joint 89 to a tie rod arm 86b of a lefthand rear knuckle 86.

The vehicle 1 can be steered by operating the handlebar 9. Movement of the handlebar 9 is transmitted through the steering stem 70, the steering lever 71, the front tie rods 73, the knuckle arms 75a, and the front knuckles 75 to the front wheels 7 to steer the latter. Such steering operation is the same as ordinary center-arm-controlled front wheel steering operation.

Steering power from the handlebar 9 is also transmitted through the second arm 71b of the steering lever 71, the steering rod 80, the bell crank 82, the drag link 84, and the knuckle arm 86a to the righthand rear wheel 8, and thence through the tie rod arm 86b of the righthand rear knuckle 86, the tie rod 88, and the tie rod arm 86b of the lefthand rear knuckle 86 to the lefthand rear wheel 8. Therefore, when the vehicle 1 is turned, the front and rear wheels are steered.

With the arrangement of the present invention, the front wheels can be steered by a steering angle greater than that of the rear wheels as described below.

The link mechanism for transmitting steering power from the handlebar to the rear wheels, that is, the link mechanism composed of the parts from the steering lever 71 to the righthand rear knuckle arm 86a, contains lever members such as the steering lever 71 and the bell crank 82. Therefore, the ratio of the steering angle of the rear wheel to the steering angle of the front wheel can be adjusted by selecting appropriate sizes of these lever members.

The above mechanism is illustrated by way of example only, and those skilled in the art will find it easy to design other mechanisms which can provide differences between the steering angles of the front and rear wheels.

Figure 6:
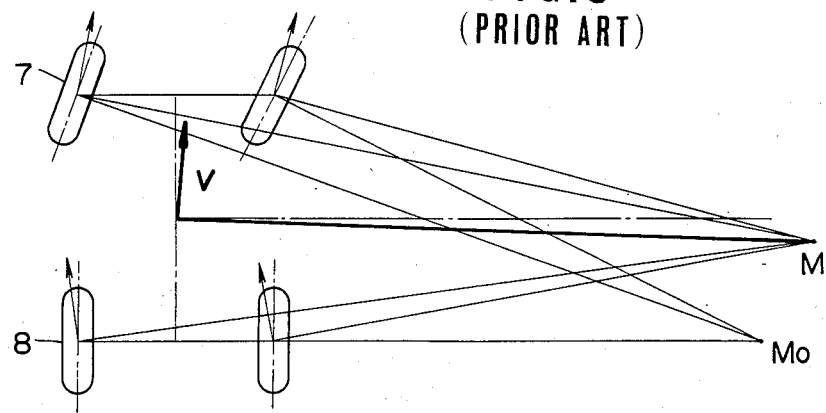
FIG. 6 is a plan view showing steering characteristics of a conventional vehicle having steerable front wheels and non-steerable rear wheels.
Figure 7:
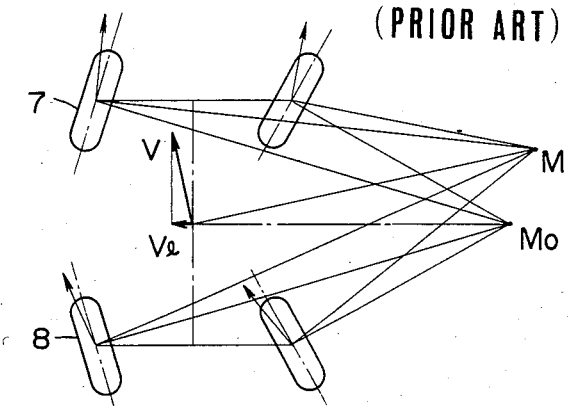
FIG. 7 is a plan view showing steering characteristics of a conventional vehicle having steerable front and rear wheels.
Figure 8:
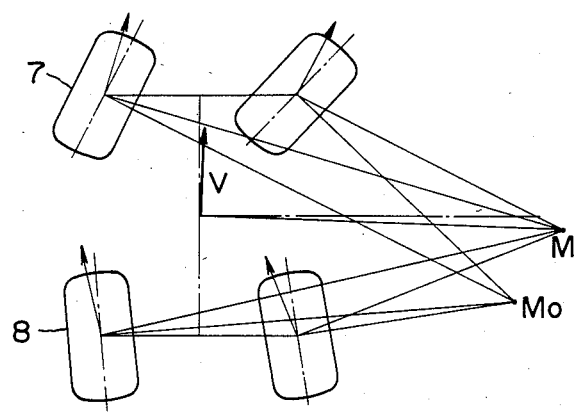
FIG. 8 is a plan view illustrating steering characteristics of the vehicle shown in FIG. 1.

Referring to FIGS. 6 through 8, described will be the operation and the advantages resulting from the arrangement in which the steering angle of the front wheels is greater than that of the rear wheels. In these figures, front wheels and the rear wheels are designated by 7 and 8, respectively, the direction of the movement of each wheel at the time the vehicle turns with such high speed as to produce a considerable slip angle is indicated with the arrow drawn on the wheel, and the velocity of the central portion of the vehicle at the same time is indicated with the arrow V. Therefore, the angle between the center line of each wheel and the arrow drawn on the wheel is the slip angle of the wheel. The center of turning movement of the vehicle falls at a point where the lines, each of which passes through the center of a wheel at right angles with the direction of the movement of the wheel, intersect each other. Such points are indicated by M or Mo according to the respective turning condition of the vehicle.

FIG. 6 illustrates steering characteristics of a conventional vehicle in which only front wheels are steerable. When the vehicle turns at a very low speed, the direction of the movement of each wheel corresponds to the heading of the wheel, so that the center of the turning of the vehicle falls at the point Mo. While, when the vehicle turns at a higher speed, a slip angle is produced on each wheel, and the position of the center of turning movement of the vehicle is changed from Mo to a point M where the lines extending at right angles with the movement directions of the wheels at that time (indicated with the arrows) intersect each other.

FIG. 7 shows steering characteristics of another conventional vehicle in which the front wheels and the rear wheels are steered by the same angle and in the opposite directions to each other. When the vehicle turns at a small speed, the center Mo of turning movement of the vehicle is positioned exactly laterally of a longitudinally central point of the vehicle body. While, when the vehicle turns with such high speed that the wheels have slip angles, the position of the center of turning is changed forward to a point M. At this time, the direction of the velocity of the vehicle at the center of the vehicle is deviated radially outwardly from the longitudinal centerline of the vehicle as indicated by the arrow V. Vl indicates the lateral component of the velocity V.

FIG. 8 illustrates steering characteristics of the four-wheel-steerable vehicle according to the preferred embodiment of the invention as described above. Since the steering angle of the front wheels is larger than that of the rear wheels at the time the vehicle is steered, the center of turning movement of the vehicle can not be located forward of a position that is exactly laterally of the longitudinally central point of the vehicle body even when the vehicle turns at relatively high speeds. Accordingly, a favorable drive feeling is ensured for the driver while at the same time allowing the reduction of the radius of the turning of the vehicle due to the four-wheel-steering. This advantage is particularly useful for all-wheel-steerable vehicles having low-pressure balloon tires since the low-pressure balloon tires have such properties that relatively large slip angles are produced when the vehicle turns.

Although there has been described what is at present considered to be the preferred embodiment of the present invention, it will be understood that the invention may be embodied in other specific forms without departing from the spirit or essential characteristics thereof. The present embodiment is therefore to be considered in all aspects as illustrative, and not restrictive. The scope of the invention is indicated by the appended claims rather than by the foregoing description.

What is claimed is:

1. An all-wheel-steerable vehicle comprising:
   two front wheels having a pair of balloon tires;
   two rear wheels having a pair of balloon tires;
   a saddle seat for allowing a driver to ride astride the vehicle;
   steering means for steering said front wheels and said rear wheels in interlinked relation;
   said steering means being adapted to steer said front wheels and said rear wheels in the opposite direction to each other, with the steering angle of said front wheels being greater than the steering angle of said rear wheels; and said steering means comprising a handle, a steering stem operatively connected to said handle, a front lever connected to said steering stem, said front lever having a first arm and a second arm, front tie rods connecting said first arm of said front lever with front knuckles of said front wheels, respectively, a rear lever operatively connected to rear knuckles of said rear wheels, said rear lever having a first arm operatively connected to said rear knuckles and a second arm, and a longitudinal link member for connecting between said second arm of said front lever and said second arm of said rear lever.

2. An all-wheel-steerable vehicle according to claim 1, wherein:

said saddle seat is positioned substantially longitudinally and centrally of said vehicle;

said handle and said steering stem are positioned along a substantially longitudinal centerline of said vehicle;

said front lever is connected to said steering stem such that such said front lever pivots about a point positioned along a substantially longitudinal centerline of said vehicle; and said rear lever is disposed such that said rear lever pivots about a point positioned along a substantially longitudinal centerline of said vehicle.

3. An all-wheel-steerable vehicle according to claim 2, wherein:

said front lever is in the form of a bell crank composed of said first arm extending forwardly and said second arm extending laterally; and said rear lever is in the form of a bell crank composed of said first arm extending rearwardly and said second arm extending laterally at the same side of said vehicle with said second arm of said front bell crank lever.

4. An all-wheel-steerable vehicle according to claim 2, further comprising:

a body frame disposed along a substantially longitudinal centerline of said vehicle.

5. An all-wheel-steerable vehicle according to claim 1, wherein:

said steering means further comprises a rear link member for connecting between said first arm of said rear lever and one of said rear knuckles of said rear wheels, and a rear tie rod for connecting said rear knuckles with each other.

* * * * *